UNITED STATES PATENT OFFICE.

HEINRICH CARO, OF MANNHEIM, BADEN, ASSIGNOR TO BADISCHE ANILIN AND SODA FABRIK, OF BADEN, GERMANY.

COLORING-MATTER OBTAINED FROM ALPHA-NAPHTHOL.

SPECIFICATION forming part of Letters Patent No. 225,108, dated March 2, 1880.

Application filed January 14, 1880.

*To all whom it may concern:*

Be it known that I, HEINRICH CARO, of Mannheim, in the Grand Duchy of Baden and Empire of Germany, have invented a new and useful Improvement in Coloring-Matters Produced from Alpha-Naphthol, which improvement is fully set forth in the following specification.

This invention relates to a yellow coloring-matter which in chemical language may be termed "sulpho-acid of dinitro-naphthol."

In preparing my new coloring-matter, I take alpha-naphthol and I convert it into its sulpho-acids different from those sulpho-acids which are already known by the name of "mono-sulpho acids of alpha-naphthol," and which, as is well known, cannot be acted upon by nitric acid without losing their sulpho groups and becoming converted into dinitro-naphthol or naphthalene-yellow, a coloring-matter insoluble in water.

Now, according to my invention, alpha-naphthol is converted into those sulpho-acids which may be acted upon by nitric acid without losing their sulpho groups entirely, and the said sulpho-acids I submit to a treatment with nitric acid in order to prepare their nitro-sulpho compounds, and especially the sulpho-acid of dinitro-naphthol, a yellow coloring-matter soluble in water.

In carrying out my invention, alpha-naphthol is dissolved in and heated with sulphuric acid until the mono-sulpho acids produced in the first stage of the process are changed into those sulpho-acids which, by the action of nitric acid, will be converted into the sulpho-acid of dinitro-naphthol.

The complete conversion of alpha-naphthol into the said sulpho-acids may be ascertained by the following test: From time to time a sample of the sulpho-acids of naphthol is mixed with about its equal weight of water and of strong nitric acid, and the said mixture is gently warmed until it assumes a light yellow color, and afterward it is diluted with water. The conversion is complete if no longer a precipitate of dinitro-naphthol is produced, and if the clear acid solution upon the addition of caustic potash separates an abundant yellow precipitate, consisting of the potassium salt of the sulpho-acid of dinitro-naphthol.

In the above process sulphuric acid may be employed in its concentrated or rectified fuming and anhydrous condition, and in any form or combination in which it is generally used for the preparation of sulpho-acids. The precise conditions of temperature and time depend upon both the relative proportion and the strength of the sulphuric acid employed in the process.

As an example of the manner in which the said sulpho-acids of alpha-naphthol may be prepared by the action of concentrated or rectified sulphuric acid upon alpha-naphthol, I proceed as follows: One part, by weight, of alpha-naphthol is dissolved in and heated with about three parts, by weight, of concentrated or rectified sulphuric acid of about 1.84 specific gravity, and the temperature of the solution is kept at about 110° to 115° centigrade during about twelve hours, or until a sample of the mixture, tested in the manner above described, indicates that the conversion is complete, or nearly so.

The action of fuming sulphuric acid proceeds within less time and at a lower temperature, and yields the best practical results.

As an example of the manner in which I prefer to operate with the employment of fuming sulphuric acid, I proceed as follows: One part, by weight, of alpha-naphthol is mixed with about two parts, by weight, of fuming sulphuric acid containing about twenty-five per cent. of free anhydrous acid, and the mixture is maintained at a temperature of about 50° centigrade until the first stage of the process—the conversion of alpha-naphthol into its mono-sulpho compounds—has been arrived at. I then add gradually about two parts, by weight, of fuming sulphuric acid containing about seventy per cent. of free anhydrous acid, and I take due care not to raise the temperature above 50° centigrade. The completion of the process is to be ascertained by the above-described test, and will in this case require about five hours.

In order to prepare the nitro-sulpho compounds of alpha-naphthol, and especially the sulpho-acid of dinitro-naphthol, by the action of nitric acid upon the napthol-sulpho acids produced by any of the above-named methods, I either employ the crude mixture of sulpho-acids and of free sulphuric acid, such as result from the treatment of alpha-naphthol with sulphuric acid, substantially as above described, or I first remove the excess of uncombined sulphuric acid by neutralization with caustic lime or otherwise, and I then prepare and further separate or purify the alkaline salts of the said naphthol-sulpho acids by crystallization or otherwise.

In either case nitric acid is to be employed of sufficient strength and quantity to convert the naphthol-sulpho acids or their salts into a clear yellow mixture of nitro-sulpho compounds, which, upon the addition of caustic potash, will produce the above-mentioned abundant yellow precipitate, consisting of the potassium-salt of the sulpho-acid of dinitronaphthol.

As an example of the manner in which the nitro-sulpho compounds of alpha-naphthol may be prepared by the direct action of nitric acid upon the crude mixture of napthol-sulpho acids, such as result from the employment of fuming sulphuric acid, as before described, I proceed as follows: The said acid mixture, produced from one part, by weight, of alpha-naphthol, is mixed with about six or seven parts of water and about two parts and one-half, by weight, of nitric acid of about 1.38 specific gravity, and at a temperature not exceeding about 50° centigrade. The mixture gradually assumes a yellow color, and after about twelve hours standing in the cold an abundant crystallization consisting of the sulpho-acid of dinitro-naphthol will be formed.

The further treatment consists in removing the excess of sulphuric acid contained in the acid mixture by neutralization with caustic lime or otherwise, and a further separation or purification may be effected by preparing the alkaline salts of the nitro-sulpho compounds and crystallizing the same from water or other suitable solvents.

By preference, I convert my yellow coloring-matter into the mercantile form of a potassium, sodium, or ammonium compound; but any other saline compound may be prepared, or the sulpho-acid of dinitro-naphthol may be sold without any further preparation.

The sulpho-acid of dinitro-naphthol is characterized by the following properties: The free sulpho-acid is easily soluble in water and alcohol, insoluble in hydrocarbons, chloroform, sulphide of carbon, and ether. Its aqueous solution is yellow, possesses an intensely acid but not bitter taste, and is precipitated by adding a large excess of strong hydrochloric, nitric, or sulphuric acid, which cause the separation of pale-yellow slender needles of the crystallized dinitro-sulpho compound.

The dinitro-sulpho acid forms golden-yellow and mostly well-crystallized salts with salifiable bases. Its most characteristic compound is the potassium-salt, which is sparingly soluble in cold water and easily soluble in hot water. Even very dilute solutions of all soluble potassium compounds are precipitated by the addition of dinitro-sulpho acid or of its saline solutions in needle-shaped crystals. The sodium, ammonium, calcium, strontium, magnesium, aluminium, and zinc compounds are easily soluble both in cold and in hot water. The barium and lead salts are scarcely soluble in cold water and sparingly soluble in boiling water.

Dinitro-naphthol sulpho-acid and its salts are gradually destroyed by continued treatment with strong nitric acid at temperatures above 50° centigrade. Cold nitric acid, even in large excess, does not act injuriously. Reducing agents, such as tin and hydrochloric acid, decolorize the coloring-matter by the reduction of its nitro groups. The dinitro-naphthol sulpho-acid has no affinity for cotton fiber; but it imparts bright and permanent yellow shades to all descriptions of animal fiber. The dyeing on wool is effected in the acid bath. The colors thus produced neither stain nor rub off like the dyes obtained with the insoluble dinitro-naphthol or analogous nitro compounds.

My yellow coloring-matter is specially adapted for being used in dyeing and printing in mixture with other dye-stuffs which possess similar acid properties, such as extract of indigo or the sulpho-acids of azo compounds.

What I claim as new, and desire to secure by Letters Patent, is—

As a new manufacture, the coloring-matter, or sulpho-acid of dinitro-alpha naphthol, obtained from the action of nitric acid upon the within-described alpha-naphthol sulpho-acids, substantially in the manner set forth, or by any other method which will produce a like result.

In testimony that I claim the foregoing I have hereunto set my hand and seal this 29th day of December, 1879.

HEINRICH CARO. [L. S.]

Witnesses:
HEINRICH SCHAEFFER,
CASPAR SCHMIDT.